US011784500B1

(12) United States Patent
Richter

(10) Patent No.: US 11,784,500 B1
(45) Date of Patent: Oct. 10, 2023

(54) SYSTEMS AND METHODS FOR OVERVOLTAGE PROTECTION ON LOADS FOR USE IN AN ELECTRIC AIRCRAFT

(71) Applicant: BETA AIR, LLC, South Burlington, VT (US)

(72) Inventor: Timothy Gerard Richter, Wynantskill, NY (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/732,169

(22) Filed: Apr. 28, 2022

(51) Int. Cl.
*H02J 7/00* (2006.01)
*B60L 3/00* (2019.01)
*H02H 3/02* (2006.01)
*B64D 27/24* (2006.01)

(52) U.S. Cl.
CPC ........ *H02J 7/00308* (2020.01); *B60L 3/0046* (2013.01); *B64D 27/24* (2013.01); *H02H 3/025* (2013.01); *B60L 2200/10* (2013.01)

(58) Field of Classification Search
CPC .......................... H02J 7/00308; B60L 3/0046; B60L 2200/10; B64D 27/24; H02H 3/025
USPC ............................................................. 361/1
See application file for complete search history.

(56) References Cited

U.S. PATENT DOCUMENTS

| | | | |
|---|---|---|---|
| 6,885,553 B2 * | 4/2005 | Pfeifer | F28F 3/12 257/E23.098 |
| 10,322,824 B1 * | 6/2019 | Demont | B60L 3/0061 |
| 10,530,167 B2 | 1/2020 | Yi et al. | |
| 10,559,861 B2 | 2/2020 | Zheng et al. | |
| 10,581,256 B2 | 3/2020 | Jung et al. | |
| 10,629,964 B2 | 4/2020 | Swaminathan et al. | |
| 10,790,678 B2 | 9/2020 | Zheng et al. | |
| 10,830,830 B2 | 11/2020 | Murata | |
| 2018/0341309 A1 | 11/2018 | Sporck et al. | |
| 2020/0067302 A1 | 2/2020 | Tsuchiya et al. | |
| 2020/0274203 A1 | 8/2020 | Kirleis et al. | |
| 2021/0070179 A1 * | 3/2021 | Wiegman | B60L 3/12 |
| 2021/0226468 A1 | 7/2021 | Zagrodnik | |

(Continued)

FOREIGN PATENT DOCUMENTS

| | | |
|---|---|---|
| DE | 102017102657 A1 | 8/2018 |
| DE | 102017102657 G | 8/2018 |
| EP | 3790139 A1 | 3/2021 |

OTHER PUBLICATIONS

Q. Liu et al.: Real-Time FPGA-Based Hardware Neural Network for Fault Detection and Isolation in More Electric Aircraft. vol. 4, 2016 (Year: 2016).*

*Primary Examiner* — Yemane Mehari
(74) *Attorney, Agent, or Firm* — CALDWELL INTELLECTUAL PROPERTY LAW

(57) ABSTRACT

A system for overvoltage protection on loads for use in an electric aircraft is presented. The system includes an energy storage element configured to produce an electrical output, a bus element, wherein the bus is configured to transfer the electrical output from the energy storage element, a plurality of inverters, wherein each inverter is configured to generate a regulated output as a function of the electrical output and detect an overvoltage output as a function of the regulated output, and a plurality of load devices connected to the plurality of inverters, wherein each load device includes a fault protection device.

20 Claims, 7 Drawing Sheets

(56) References Cited

U.S. PATENT DOCUMENTS

2021/0257693 A1     8/2021   Lee
2022/0306305 A1*   9/2022   Cottrell .................. B64D 27/24

* cited by examiner

SYSTEMS AND METHODS FOR OVERVOLTAGE PROTECTION ON LOADS FOR USE IN AN ELECTRIC AIRCRAFT

FIELD OF THE INVENTION

The present invention generally relates to the field of overvoltage protection. In particular, the present invention is directed to systems and methods for overvoltage protection on loads for use in an electric aircraft.

BACKGROUND

Electric vehicles typically derive their operational power from onboard rechargeable batteries. Electric vehicles also hold great promise in their ability to run using sustainably source energy, without increase atmospheric carbon associated with burning of fossil fuels. Electric vehicles such as electric aircrafts open a new level of sustainable transportation. However, the abundance of electrical components relying on onboard rechargeable batteries pose a greater risk to electrical faults, short circuits, or damaged wiring due to external environmental factors. This could result in poor energy storage and consequently reduced range and operation of electric aircrafts. Moreover, compromised electrical components midflight can be catastrophic to not only the passengers of the electric aircraft, but also the electric aircraft as a whole including its individual flight components in the event of a crash landing.

SUMMARY OF THE DISCLOSURE

In an aspect, a system for overvoltage protection on loads for use in an electric aircraft is presented. The system includes an energy storage element configured to produce an electrical output, a bus element, wherein the bus is configured to transfer the electrical output from the energy storage element, a plurality of inverters, wherein each inverter is configured to generate a regulated output as a function of the electrical output and detect an overvoltage output as a function of the regulated output, and a plurality of load devices connected to the plurality of inverters, wherein each load device includes a fault protection device.

In another aspect, a method for overvoltage protection on loads for use in an electric aircraft is presented. The method includes detecting, by a computing device, an overvoltage output, generating a mitigation response as a function of the overvoltage output, and activating the mitigation response as a function of a fault protection device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
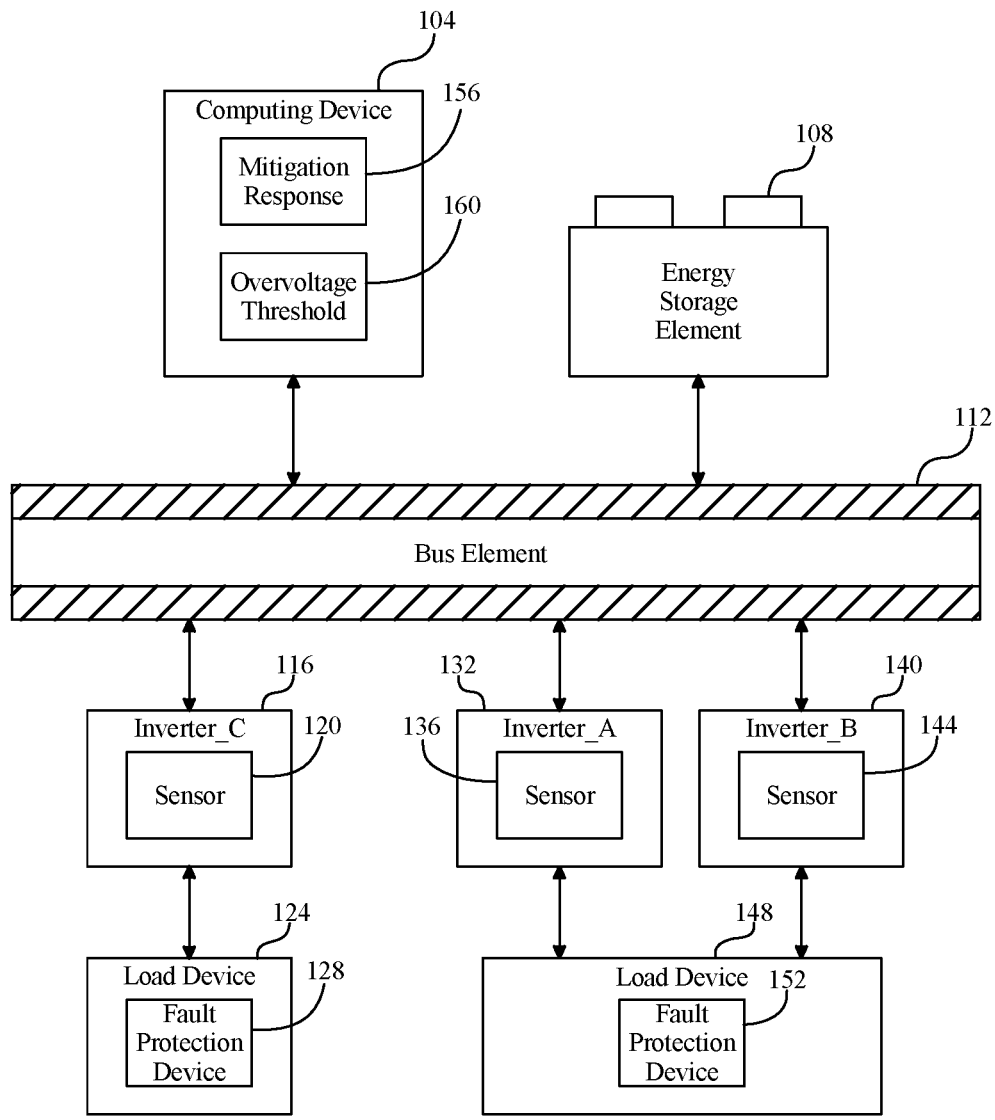
FIG. 1 is a block diagram of an exemplary embodiment of a system for overvoltage protection on loads for use in an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for overvoltage protection on loads for use in an electric aircraft. In an embodiment, aspects relate specifically to a system for overvoltage protection in an electric aircraft and its flight components. For example, the system may include a fault protection device to protect at least the electric aircraft and the flight components in the event of an electrical fault, ground fault, power surge, undervoltage, overvoltage, etc. In another embodiment, loads of the electric aircraft are any flight component of the electric aircraft that consumes electricity and/or provides lift and/or movement of the electric aircraft. Aspects of the present disclosure also relate to providing continuous electrical output through a bus element. Inverters serve to regulate the electrical output to operate the loads of the electric aircraft. The inverters also serve to match the speed of the loads of the electric aircraft to minimize wasting energy. Aspects of the present disclosure can detect an electrical fault or the risk of an electrical fault, and respond to it to minimize wasting energy, damage to the loads, and safety of any personnel or electrical equipment of the electric aircraft.

Aspects of the present disclosure can be used to protect the loads of the electric aircraft in the event of any fault. In an embodiment, each load may be connected to one or more inverters that regulate the electrical output from the energy storage element to optimize and efficiently operate the loads. In another embodiment, the sensor in the inverters may detect potential risk of a fault and/or identify a fault and activate a mitigation response to protect the loads from any damage caused by the fault. This is so, at least in part, to reduce energy waste, mitigate significant negative impact to the life cycle of the loads, etc. Aspects of the present disclosure can also be used to ensure an inverter is continuously regulating electrical output for its respective load to maximize efficiency. For example, a load such as an electric motor or pusher may be controlled by two inverters. This is so, at least in part, if a fault is present in an inverter, that inverter may be toggled off exclusively while the other inverter can take on the load of controlling the electrical output to maintain continuous operation of the load.

Aspects of the present disclosure can further include computing and/or measuring the potential causes of a fault. In an embodiment, a sensor or computing device may use an overvoltage threshold comprising some value that indicates whether a response is to be undertaken to protect a load from an overvoltage event or potential of an overvoltage event. Aspects of the present disclosure can further be used to connect with communication, control, and/or sensor signals associated with an electric vehicle during operations such as recharging, thereby allowing for monitoring of the recharge and feedback control of various recharging systems, for example power sources and overvoltage systems. Aspects of the present disclosure can also be used to verify functionality of electric aircraft recharging systems. This is so, at least in part, because certain electric vehicles, such as electric aircraft require highest assurance of technical processes associated with their maintenance.

Referring now to FIG. 1, an exemplary embodiment of a system 100 for overvoltage protection on loads for use in an electric aircraft is illustrated. The electric aircraft may include any electric aircraft and/or vehicle such as, but not limited to, electrical vertical take-off and landing (eVTOL) aircraft, unmanned aerial vehicle (UAV), drone, and the like thereof. System 100 includes a computing device 104. In a non-limiting embodiment, computing device 104 may include a flight controller. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 104 may include a single computing device operating independently, or may include two or more computing device operating in concert, in parallel, sequentially or the like; two or more computing devices may be included together in a single computing device or in two or more computing devices. computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 104 may include but is not limited to, for example, a computing device or cluster of computing devices in a first location and a second computing device or cluster of computing devices in a second location. computing device 104 may include one or more computing devices dedicated to data storage, security, distribution of traffic for load balancing, and the like. computing device 104 may distribute one or more computing tasks as described below across a plurality of computing devices of computing device, which may operate in parallel, in series, redundantly, or in any other manner used for distribution of tasks or memory between computing devices. computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In a non-limiting embodiment, and still referring to FIG. 1, Computing device 104 may be a part of another circuit. Computing device 104 may, in some embodiments, be used to control and/or activate an overvoltage protection circuit as described in further detail below. For example, and without limitation, computing device 104 may include an analog circuit including one or more operational amplifiers and/or transistors. In another example, and without limitation, computing device 104 may include a logic circuit including one or more logic gates. As used in this disclosure, a "logic circuit" is a circuit for performing logical operations on signal (e.g. input signals). In yet another example, and without limitation, computing device 104 computing device 104 may include a processor. In some cases, computing device 104 may include, for example and without limitation, a single circuit element such as a switch, a fuse, a circuit breaker switch or a single transistor. Computing device 104 may also include, for example and without limitation, an application-specific integrated circuit (ASIC), a field programmable gate array (FPGA), a microcontroller and/or a computing device.

Still referring to FIG. 1, as used in this disclosure, "communicatively connected" is an attribute of a connection, attachment or linkage between two or more relatable which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, system 100 includes an energy storage element 108. An "energy storage element," as used in this disclosure, is a source of electrical power. For example and without limitation, energy storage element 108 may include a battery, battery pack, battery module, or combination thereof. In some cases, energy storage element 108 may include a charging battery (i.e., a battery used for charging other batteries.) A charging battery is notably contrasted with an electric vehicle battery, which is located for example upon an electric aircraft. As used in this disclosure, an "electrical charging current" is a flow of electrical charge that facilitates an increase in stored electrical energy of an energy storage, such as without limitation a battery. A charging battery may include a plurality of batteries, battery modules, and/or battery cells. A charging battery may be configured to store a range of electrical energy, for example a range of between about 5 KWh and about 5,000 KWh.

Still referring to FIG. 1, energy storage element 108 may include a battery module. A "battery module," as used in this disclosure, is a battery unit that contains a plurality of battery cells that have been wired together in series, parallel, or a combination of series and parallel, wherein the "battery module" holds the battery cells in a fixed position. For instance and without limitation, the battery module may be consistent with any battery module disclosed in U.S. application Ser. No. 17/404,500 and entitled, "STACK BATTERY PACK FOR ELECTRIC VERTICAL TAKE-OFF AND LANDING AIRCRAFT," which is incorporated by reference herein in its entirety. Alternatively or additionally, the battery module may be consistent with the battery module in U.S. application Ser. No. 17/475,743, and entitled "BATTERY SYSTEM AND METHOD OF AN ELECTRIC AIRCRAFT WITH SPRING CONDUCTORS," which is incorporated by reference herein in its entirety. The plurality of battery modules may be housed within a battery pack. A "battery pack," as used in this is an energy storage devices that includes a plurality of battery modules. For instance and without limitation, the battery pack may be consistent with the battery pack in U.S. patent application Ser. No. 17/515,519, and entitled, "SYSTEM FOR OVERVOLTAGE PROTECTION IN AN ELECTRIC AIRCRAFT AND A METHOD FOR ITS USE," which is incorporated by reference herein in its entirety. The battery packs may include a battery management system integrated into the battery pack. For instance and without limitation, battery management system may be consistent with the disclosure of any battery management system in U.S. patent application Ser. No. 17/128,798 and title SYSTEMS AND METHODS FOR A BATTERY MANAGEMENT SYSTEM INTEGRATED IN A BATTERY PACK CONFIGURED FOR USE IN ELECTRIC AIRCRAFT," which is incorporated herein by reference in its entirety. Persons skilled in the art, upon reviewing the entirety of this disclosure, will be aware of the various flight components that may represent the battery packs consistently with this disclosure.

With continued reference to FIG. 1, energy storage element 108 is configured to provide electrical output. "Electrical output," as used in this disclosure, is electrical energy produced from energy storage element 108 and used by other electrical components for power consumption. The electrical output may travel through a bus element 112. A "bus element," as used in this disclosure is a component including a metallic strip or bar configured for local high current/voltage power distribution. For instance and without limitation, bus element 112 may be consistent with the electrical bridging device in U.S. patent application Ser. No. 17/405,365, and entitled, "BATTERY ASSEMBLY FOR AN AIRCRAFT," which is incorporated by reference herein in its entirety. In a non-limiting embodiment, bus element 112 may include any bus element in U.S. patent application Ser. No. 17/564,361, and entitled "SYSTEMS AND METHODS FOR LAMINATED BUSWORK WITH FLEXIBLE CONDUCTORS FOR AN ELECTRIC AIRCRAFT," the entirety of which is incorporated herein by reference. In some embodiments, bus element 112 may include a ring bus as described in FIG. 4. For instance and without limitation, the ring bus may be consistent with the ring bus in U.S. patent application Ser. No. 17/348,240 and entitled, "SYSTEM AND METHOD FOR DYNAMIC EXCITATION OF AN ENERGY STORAGE ELEMENT CONFIGURED FOR USE IN AN ELECTRIC AIRCRAFT," which is incorporated by reference herein in its entirety.

Still referring to FIG. 1, bus element 112 may include and/or be made up of any conductive element. A conductive element may include copper, brass, aluminum, and/or other conductive elements. In some embodiments, bus element 112 may include any flexible material. In other embodiments, bus element 112 may include a rigid material. Bus element 112 may include a switchboard and/or switchgear. In some embodiments, bus element 112 may be configured to include a curved structure. In some embodiments, bus element 112 may include a plurality of curved structures. In some embodiments, bus element 112 may include a braided structure. A braided structure may include a plurality of conductive wires that may be wrapped into a single braid. A braided structure may allow for a flexibility of bus element 112. In some embodiments, bus element 112 may include a laminated structure. Bus element 112 may include a plurality of layers of laminated materials and/or conductive materials. In a non-limiting example, bus element 112 may include a structural frame surrounding a plurality of thin conductor layers. In some embodiments, bus element 112 may include a busbar. In some embodiments, bus element 112 may include a shape. A shape may include, but is not limited to, a rectangular, hexagonal, circular, square, triangular, and/or other shapes. In some embodiments, electrical bus element 112 may include a flat, bar, and/or rod shape.

With continued reference to FIG. 1, bus element 112 may include a laminated busbar. A "laminated busbar," for the purpose of this disclosure, is an engineered component consisting of layers of conducting material, such as without limitation fabricated copper, separated by thin dielectric materials, laminated into a unified structure. In a non-limiting embodiment, a laminated busbar may be integrated within the electric aircraft and covering the interior of the body of the electric aircraft while connecting to a plurality of electrical devices 108 for electric power distribution. "Electric power distribution," for the purpose of this disclosure, is a distribution of electrical power from power sources of the aircraft, such as without limitation battery packs, throughout an electric aircraft's subsystems. The electric power distribution may be distributed evenly or managed by a computing device 116. In a non-limiting embodiment, the electric power distribution may include distributing electrical energy based on a triage manner.

For example and without limitation, while the lowest possible resistance and inductance values are to be preferred in a busbar for electric aircraft power distribution, some busbars for that purpose have capacitance added in different ways to increase the charge-carrying capabilities of the power-distribution structure. In another embodiment, the laminated busbar may include any common connection in electrical parlance to which any number of loads, which may be connected in parallel, and share a relatively similar voltage may be electrically coupled. In a non-limiting embodiment, the laminated busbar may include, but not limited to, power busses, audio busses, video busses, computing address busses, and/or data busses. The laminated busbar may be responsible for transferring and/or conveying an electrical output stored in energy storage element 104. The same or a distinct laminated busbar may additionally or alternatively responsible for transferring and/or conveying electrical signals generated by any number of components to any destination on or offboard the electric aircraft. An end cap may comprise wiring or conductive surfaces only in portions required to electrically couple the laminated busbar to electrical power or necessary circuits to convey that power or signals to their destinations. Persons skilled in the art, upon reviewing the entirety of this disclosure, will be aware of the various functions of a laminated busbar in the context of power distribution.

With continued reference to FIG. 1, bus element 112 may include a conductor having a distal end approximately located within electric aircraft and in electric communication with energy storage element 108. As used in this disclosure, a "conductor" is a physical device and/or object that facilitates conduction, for example electrical conduction and/or thermal conduction. As used in this disclosure, "conduction" is a process by which one or more of heat and/or electricity is transmitted through a substance, for example when there is a difference of effort (i.e., temperature or electrical potential) between adjoining regions. In some cases, a conductor may be configured to charge and/or recharge an electric vehicle. For instance, conductor may be connected to energy storage element 108 and conductor may be designed and/or configured to facilitate a specified amount of electrical power, current, or current type. In some cases, a conductor may be an electrical conductor, for example a wire and/or cable. Exemplary conductor materials include metals, such as without limitation copper, nickel, steel, and the like. In some embodiments, a conductor may include a ground conductor. As used in this disclosure, a "ground conductor" is a conductor configured to be in electrical communication with a ground. As used in this disclosure, a "ground" is a reference point in an electrical circuit, a common return path for electric current, or a direct physical connection to the earth. Ground may include an absolute ground such as earth or ground may include a relative (or reference) ground, for example in a floating configuration. As used in this disclosure, "communication" is an attribute wherein two or more relata interact with one another, for example within a specific domain or in a certain manner. In some cases, communication between two or more relata may be of a specific domain, such as without limitation electric communication, fluidic communication, informatic communication, mechanic communication, and the like. As used in this disclosure, "electric communication" is an attribute wherein two or more relata interact with one another by way of an electric current or electricity in general. As used in this disclosure, "fluidic communication" is an attribute wherein two or more relata interact with one another by way of a fluidic flow or fluid in general. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity).

With continued reference to FIG. 1, in a non-limiting embodiment, bus element 112 may be used to connect energy storage element 104 and/or a plurality of energy storage elements. This is so, at least in part, for even and/or managed electrical power distribution among the plurality of battery modules in order to power various subsystems of the electric aircraft. In another non-limiting embodiment, bus element 112 may be used to connect energy storage element 104 to a plurality of load devices via a plurality of inverters. For example and without limitation, bus element 112 may serve as a medium to form an electrical connection between energy storage element 104 and the plurality of load devices and/or the plurality of inverters. Electrical connection," for the purpose of this disclosure, is a link that allows of the transfer of an electrical output from energy storage element 108. In some embodiments, bus element 112 may connect computing device 104 to a plurality of load devices via a physical CAN bus unit which may be consistent with the physical CAN bus unit in U.S. patent application Ser. No. 17/218,312 and entitled, "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated by reference herein in its entirety. Persons skilled in the art, upon reviewing the entirety of this disclosure, will be aware of the various embodiments of a bus element for transferring a plurality of signals and/or electricity for purposes as described herein.

Still referring to FIG. 1, a "controller area network bus," as used in this disclosure, is vehicle bus unit including a central processing unit (CPU), a CAN controller, and a transceiver designed to allow devices to communicate with each other's applications without the need of a host computer. A controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks; circuit elements may be used to implement CAN bus components and/or constituent parts as described in further detail below. A CAN bus unit may include multiplex electrical wiring for transmission of multiplexed signaling. A CAN bus unit may include message-based protocol(s), wherein the invoking program sends a message to a process and relies on that process and its supporting infrastructure to then select and run appropriate programing. A plurality of CAN bus units may be located at bus element 112.

Still referring to FIG. 1, bus element 112 may include a plurality of controller area network gateways communicatively connected to a plurality of physical controller area network buses, wherein the plurality of controller area network gateways are configured to transmit a plurality of data. A "controller area network gateway," as used in this disclosure, is a piece of networking hardware used for transmission of data signals from one discrete network to another. A CAN gateway may include routers and/or switches which may provide interoperability between physical CAN bus units communicatively connected with switches, such as Ethernet switches, wherein the intraoperatively may include the transmission of data between battery assembly 600 and the Ethernet switch. A CAN gateway may include internet protocol (IP) network gateways, internet-to-orbit gateways, cloud storage gateways, internet-of-things (IoT) gateways, network switch, among other devices.

Alternatively or additionally, and still referring to FIG. 1, a plurality of inverters may be configured to distribute electrical power of energy storage element 104 of an electric aircraft throughout a plurality of load devices of the electric aircraft. In a non-limiting embodiment, each inverter may be associated with providing electrical energy to specific and/or unique load devices of the electric aircraft. In a non-limiting embodiment, the electric distribution may be generated by computing device 104 integrated with bus element 112. Bus element 112 may be wrapped within the body of the electric aircraft and stretch throughout the electric aircraft and form an electrical connection with each flight component. This is so, at least in part, for bus element 112 to distribute electric power to each flight component. In a non-limiting embodiment, bus element 112 may include a terminal block to distribute electrical power from energy storage element 104 of the electric aircraft. Persons skilled in the art, upon reviewing the entirety of this disclosure, will be aware of the various embodiments of electrical connections in the context of busbars and electric power distribution.

Still referring to FIG. 1, system 100 may include a plurality of inverters. An "inverter," as used in this disclosure, is an electrical device used to turn direct current (DC) to alternating current (AC). For instance and without limitation, an inverter, a motor, a winding, and the like thereof, may be consistent with any related components found in U.S. patent application Ser. No. 17/563,498 and entitled, "AN ELECTRIC AIRCRAFT LIFT MOTOR WITH AIR COOLING," which is incorporated by reference herein in its entirety. In a non-limiting embodiment, inverters may be responsible for controlling speed and torque for load devices. Energy storage element 108 may produce an electrical output for an inverter to consume it via bus element 112. An inverter may generate a regulated output. As used in this disclosure, a "regulated output," is a controlled electrical output to be consumed by a load device to avoid wasting energy. For example and without limitation, an inverter may generate a regulated output including a voltage of 240 to 600 volts of AC to power a low voltage load device such as fans, pumps, etc. In another non-limiting example, an inverter may generate a regulated output including a voltage of 4160 to 69,000 volts of AC to power a high voltage load device such as electric motors, propellers, pushers, and the like thereof. Persons skilled in the art, upon reviewing the entirety of this disclosure, will be aware of the various purposes of an inverter in the context of energy saving.

With continued reference to FIG. 1, system 100 may include a plurality of inverters wherein each inverter is configured to regulate electrical output for an individual load device. For example and without limitation, inverter_C 116 may regulate an electrical output and provide a regulated output to load device 124. In an embodiment, a load device 148 may be regulated by more than one inverter such as inverter_A 132 and inverter_B 140. In another embodiment, a plurality of load devices may be regulated by one inverter. Each inverter may include a sensor. As used in this disclosure, a "sensor" is a device that is configured to detect a phenomenon and transmit information related to the detection of the phenomenon. A sensor may detect a phenomenon indicative of an electrical fault, overvoltage, and/or ground fault. For example, in some cases a sensor may transduce a detected phenomenon, such as without limitation, voltage, current, speed, direction, force, torque, temperature, pressure, and the like, into a sensed signal. A sensor may include one or more sensors which may be the same, similar or different. A sensor may include a plurality of sensors which may be the same, similar or different. A sensor may include one or more sensor suites with sensors in each sensor suite being the same, similar or different. In a non-limiting embodiment, a sensor may include any number of suitable sensors which may be efficaciously used to detect an electrical output from energy storage element 108. For example, and without limitation, these sensors may include a voltage sensor, current sensor, multimeter, voltmeter, ammeter, electrical current sensor, resistance sensor, impedance sensor, capacitance sensor, a Wheatstone bridge, displacements sensor, vibration sensor, Daly detector, electroscope, electron multiplier, Faraday cup, galvanometer, Hall effect sensor, Hall probe, magnetic sensor, optical sensor, magnetometer, magnetoresistance sensor, MEMS magnetic field sensor, metal detector, planar Hall sensor, thermal sensor, and the like, among others. In another non-limiting example, a sensor ay include hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, and the like. A sensor may include any computing device as described in the entirety of this disclosure and configured to convert and/or translate a plurality of signals detected into electrical signals for further analysis and/or manipulation. In a non-limiting embodiment, a sensor may efficaciously include, without limitation, any of the sensors disclosed in the entirety of the present disclosure.

With continued reference to FIG. 1, a sensor may be communicatively connected to computing device 104. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, a sensor of an inverter may be configured to detect an overvoltage output as a function of a regulated output. An "overvoltage output," as used in this disclosure is an electrical event that occurs when the electrical current that passes through an electrical device exceeds a given operating range due to a sharp rise in voltage within the circuit. For example and without limitation, an overvoltage output may include an input DC power of an electrical output to exceed the compatible power rate of an inverter and/or a connected load device. In a non-limiting embodiment, an overvoltage output may include power outages such as a Single Line-to-Ground (SLG) short-circuit events, or "faults." An overvoltage output may be a result from an electrical event occurring within a load device and/or inverter.

Still referring to FIG. 1, a sensor may be configured to measure a plurality of faults such as, but not limited to, phase to phase faults, three phase faults and ground faults. Phase to phase faults or "short circuits" are found within a device when an overloaded electrical current flows through a wire and burns it out. A "ground fault," as used in this disclosure, is any time when electric current is running from somewhere in your circuit to the ground. For example and without limitation, a ground fault may include an inadvertent contact between an energized conductor and ground or equipment frame. The return path of the fault current is through the grounding system and any personnel or equipment that becomes part of that system. In some embodiments, a ground fault may include a Ground Fault Over-Voltage (GFOV).

In a non-limiting embodiment, and still referring to FIG. 1, a sensor may measure an environmental exposure data. An "environmental exposure data," as used in this disclosure, is any information that may cause or be indicative of a fault. In a non-limiting embodiment, environmental exposure data may include measured data describing inclement weather, reduced insulation from age and/or life cycle of an inverter and/or a load device, reduced insulation from bus element 112 and/or energy storage element 108, excessive overvoltage and/or undervoltage, or combination thereof. A sensor may also be configured to measure mechanical damage and exposure to chemicals, moisture, dust, and the like thereof. A sensor may identify an overvoltage output as a function of environmental exposure data within a load device.

With continued reference to FIG. 1, a "load device" as used in this disclosure, is any electrical device and/or flight component that consumes electricity. A load device may be provided a regulated output from an inverter to maximize efficiency. A "flight component", for the purposes of this disclosure, is any component related to, and mechanically connected to an aircraft that manipulates a fluid medium in order to propel and maneuver the aircraft through the fluid medium. For example and without limitation, a flight component may include, propellers, vertical propulsors, forward pushers, landing gears, rudders, electric motors, rotors, and the like thereof. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components. A propulsor may include a mechanical device that creates propulsion using rotary motion. A propulsor and its rotary motion speed may be regulated by an inverter. Persons skilled in the art, upon reviewing the entirety of this disclosure, will be aware of the various flight components that may represent the battery packs consistently with this disclosure.

Still referring to FIG. 1, a plurality of load devices may be connected to a plurality of inverters, wherein each load device includes a fault protection device. A "fault protection device," as used in this disclosure, is a protection system used to protect an electric aircraft and its various load devices and/or flight components from an overvoltage, ground fault, current fault, electrical damage, and the like thereof. For example and without limitation, in some cases, a fault protection device may be comprised of a device that dissipates excess voltage to ground when the voltage is outside of a given range. Exemplary examples of these fault protection devices include without limitation, a metal oxide varistor (MOV), a transient voltage surge suppression diode/Zener diode, thyristor surge fault protection device, gas discharge tube, selenium voltage suppressor, carbon block spark gap overvoltage suppressor, quarter-wave coaxial surge arrestor, series mode (SM) surge suppressors, and the like. In some embodiments, a fault protection device may be configured to provide a safety mechanism during use of a load device in the event a fault is detected. In a non-limiting embodiment, a fault protection device may include a protection circuit found in U.S. patent application Ser. No. 17/515,515, and entitled, "CONNECTOR WITH OVER-VOLTAGE PROTECTION AND METHODS OF USE FOR CHARGING AN ELECTRIC AIRCRAFT," which is incorporated by reference herein in its entirety. Alternatively or additionally, a fault protection device may be comprised within an inverter.

Still referring to FIG. 1, a fault protection device may include any suitable circuit and/or circuit breaker. For example, and without limitation, a fault protection device may include a Zener voltage regulator circuit, Zener diode circuit, transient voltage suppression (TVS) diode, crowbar protection circuit, voltage clamping circuit, voltage limiting circuit, a metal oxide varistor (MOV), thyristor surge fault protection device (TSPD), gas discharge tube (GDT), selenium voltage suppressor, carbon block spark gap overvoltage suppressor, quarter-wave coaxial surge arrestor, series mode (SM) surge suppressors, and the like, among others. In an embodiment, a fault protection device may include a Zener circuit. A fault protection device may include one or more switches such as electrical switches or the like. These switches may be used to shut off (and/or turn on) electrical flow and/or regulate or control electrical flow through an inverter. A fault protection device may include one or more variable resistors, or the like, which may be used to regulate or control electrical flow and/or to shut off (and/or turn on) electrical flow through an inverter. A fault protection device may include, without limitation, a surge protector, spike suppressor, surge suppressor, surge diverter, and the like, among other devices for providing protection from voltage spikes and/or surges. In some cases, and without limitation, a fault protection device may dissipate excess voltage to ground when the voltage is outside of a given range.

Still referring to FIG. 1, a fault protection device may include a current transformer (CT) and/or connected to a current transformer. A "current transformer," as used in this disclosure is a device that is used to reduce or multiply an alternating current. It produces a current in its secondary which is proportional to the current in its primary. In a non-limiting embodiment, a CT is hooked up to a sensor such as a meter that gives a reading based on how much current is flowing through the primary side of the transformer: 5 A of current in your CT might mean that you have 500 A of current flowing through your ground line. This is so, at least in part, so the meter may inform a fault is present and that a ground line is getting current when it really shouldn't be. In another embodiment, fault protection device may include a plurality of current transformers attached at different points in a load device and/or inverter so a fault can be easily identified.

With continued reference to FIG. 1, a fault protection device may include a relay. A relay is a device with adjustable settings that is used to determine whether or not to trip (open) a circuit breaker. A relay may include a ground fault protection relay (GFPR). A "ground fault protection relay," as used in this disclosure, is a fault protection device that detects low magnitude ground faults. In a non-limiting embodiment, when a ground fault current magnitude and time reaches a GFPR, an inverter may signal a circuit disconnect to open, thereby eliminating electric flow to a load device which may be damaged due a fault.

For example, and without limitation, a fault protection device may terminate transmission of electrical power, voltage and/or current to a charging target (e.g. energy storage element 108) on detection of an overload condition or overvoltage. In another example, and without limitation, a fault protection device may lower and/or modify transmission of electrical power, voltage and/or current to charging target (e.g. energy storage element 108) on detection of an overload condition or overvoltage. A fault protection device, without limitation, may be considered to provide means to trip the charging circuit (or shut off or disrupt electrical flow therethrough) in the event of an overload condition or overvoltage.

With continued reference to FIG. 1, once a fault is detected, a fault protection device may be configured to clear it. In a non-limiting embodiment, a fault protection device may include a. A "fuse," as used in this disclosure is essentially a wire that is designed to be destroyed when a certain number of current passes through it and/or fault is detected. In another non-limiting embodiment a fault protection device may include a circuit breaker. A "circuit breaker," as used in this disclosure, is a pathway that is mechanically forced open when too much current passes through it. In another embodiment a fault protection device may include a relay such as a ground fault protection relay (GFPR). A fault protection device may be configured to activate mitigation response 156 as a function of an overvoltage output. A "mitigation response," as used in this disclosure, is safety mechanism and/or measure to provide protection from faults such as overvoltage, electrical faults, ground faults, etc., to the load devices and/or inverters. In some embodiments, mitigation response 156 may include computing device 104 turning off relevant inverters to the load device in which a fault is present. For example in the event a fault is present in load device 124, computing device 104 may shut down inverter_C 116. Alternatively or additionally, inverter_C 116 and/or load device 124 may shut down independently in response to the fault via fault protection device 128. In another embodiment, load device 148 may be controlled by two inverters, inverter A 132 and inverter_B 140, in which both inverters may work in tandem to mitigate the potential damages caused by a fault in load device 148. Alternatively or additionally, inverter_A 132 may experience a fault in which it will shut down via computing device 104 and/or by itself while inverter_B 140 continues to control load device 148. Persons skilled in the art, upon reviewing the entirety of this disclosure, will be aware of the various embodiments of a computing device, inverters, and load devices, working alone, or in combination, to perform mitigation response 156.

With continued reference to FIG. 1, exemplary embodiments of mitigation response 156 may include the use of a Crowbar circuit, Voltage clamping, and Zener Circuit. As used in this disclosure, a "Crowbar circuit" is an electrical circuit that works by sensing a voltage that is above a certain threshold by the use of an operational amplifier or some form of a logic gate. Once the determination that the voltage is too high shorting out the power supply. As used in this disclosure, "Voltage Clamping" specifies that a spike voltage will cause the protective components inside an overvoltage protection circuit to short or clamp. Voltage clamping may occur as a result of the use of an operation amplifier to determine when there is a voltage surge. Clamping will bind the upper or lower extreme of a waveform to a voltage level, once the voltage level is outside of a given value current will be clamped or shut off. As used in this disclosure, a "Zener Circuit" is any circuit that consists of at least a Zener diode for its primary method of overvoltage protection. For example, some embodiments of system 100 may contain Zener Circuit as its primary form of a fault protection device.

With continued reference to FIG. 1, in some embodiments, computing device 104 is configured to determine overvoltage output within the system and activate the fault protection device based on a predetermined set of output voltages from the system. In some embodiments of system 100, computing device 104 may decide that an overvoltage has occurred by taking a reading the voltage within the system it will send a signal to trip the fault protection device. Once the fault protection device is tripped all remaining voltage will be sent to some ground conductor or dissipated through the electric aircraft to ground. In a non-limiting embodiment, mitigation response 156 may be activated by computing device 104. For example and without limitation, computing device 104 may be communicatively connected to a sensor and/or fault protection device in order to identify and respond to a fault. In some embodiments, mitigation response 156 may be activated based on an overvoltage threshold 160. An "overvoltage threshold," as used in this disclosure, is a value a quantifiable magnitude of voltage that any electrical device, circuit, load device, and/or inverter must exceed, stay below, and/or reach for a certain phenomenon to occur. The voltage threshold may include a standard deviation that may distinguish the voltage of the systems of the electric aircraft and its components from adequate, average, or acceptable to either severely above average or severely below average in voltage and/or risk of overvoltage. In some embodiments, the voltage threshold may include a variety of metrics denoting a satisfactory level of voltage, such as any measured environmental exposure data.

Still referring to FIG. 1, in an embodiment, activating or actuating, by computing device 104, fault protection device may include tripping fault protection device. Computing device 104 may trip a fuse of a fault protection device based on determination and/or detection of overvoltage output. Tripping a fault protection device may include any mechanism to shut off electrical flow through a load device and/or inverter as a function of detection of an overvoltage output. In a non-limiting embodiment, tripping a fault protection device may include, without limitation, use of any electrical switches or the like. As used herein, "tripping" is an act of disconnecting, shorting, and/or blocking a circuit to perform mitigation response 156. Tripping may involve automatically activating a mechanism, for example and without limitation, by using an electrical contact or switch, to shut-off electrical power as a precautionary or safety measure. Tripping may also include shorting or shunting circuits, which discharge electrical current by a low resistance bypass. In an embodiment, activating or actuating, by computing device 104, a fault protection device may include terminating transmission of electrical output from energy storage element 108. In an embodiment, activating or actuating, by computing device 104, fault protection device may include regulating output voltage. Regulation may involve decreasing (and in some cases, even increasing) the value of output voltage and/or charging voltage being outputted or emanating from energy storage element 108. Persons skilled in the art, upon reviewing the entirety of this disclosure, will be aware of the various embodiments of overvoltage protection for purposes as described herein.

Still referring to FIG. 1, mitigation response 156 may be activated by computing device 104 in the event any sensor detects a fault and/or potential of a fault. In a non-limiting embodiment, mitigation response 156 may include a corrective action. As used in this disclosure a "corrective action" is an action conducted by the plurality of flight components of electric aircraft to correct and/or alter a movement of a load device such as a propulsor, electric motor, inverter, pusher, and the like thereof. For example, and without limitation, a corrective action may include an action to increase altitude generated by a fault. In some embodiments electrical faults may be a result of an impact experienced by the electric aircraft. For instance and without limitation, mitigation response 156 may be consistent with any action and/or detection in U.S. patent application Ser. No. 17/474,435, and entitled, "SYSTEM AND METHOD FOR IMPACT DETECTION CAPABILITIES," which is incorporated by reference herein in its entirety. In an embodiment, and without limitation, a corrective action may include a strike force command. As used in this disclosure a "strike force command" is a command and/or signal to a load device that reduces a strike force, wherein a strike force is an amount of force that is induced as a function of a load device striking and/or interacting with the extraneous object. For example, and without limitation, strike force command may include a command that signals one or more propellers to rotate and/or operate at a reduced speed and/or velocity such that a strike force is reduced. In another embodiment, and without limitation, corrective action 132 may include a reverse torque command. As used in this disclosure a "reverse torque command" is a command directing a load device to reduce and/or reverse a first torque magnitude and/or direction. As a non-limiting example, reverse torque command may command a propeller that has a first torque of 9 Nm in a clockwise direction to reduce the torque to 2 Nm in the same clockwise direction. As a further non-limiting example, reverse torque command may command a rotor that has a first torque of 7 Nm in a clockwise direction to reverse the torque direction to counterclockwise with a torque of 3 Nm. For instance and without limitation, may include may include any corrective action as described in U.S. Nonprovisional application Ser. No. 17/222,539, and entitled "AIRCRAFT FOR SELF-NEUTRALIZING FLIGHT," the entirety of which is incorporated herein by reference.

In an embodiment, and still referring to FIG. 1, inducing aerodynamic drag may include moving a load device into a reverse speed mode. As used in this disclosure a "reverse speed mode" is a mode and/or setting denoting that a load device is rotating and/or moving at a rate, wherein the rotation and/or movement is opposite to a first rotation and/or movement. For example, and without limitation, reverse speed mode may include a propeller that rotates around a shaft at 8,000 revolutions per minute in a clockwise direction. In an embodiment inducing aerodynamic drag may further comprise dissipating a forward momentum by pushing air against a load device. For example, and without limitation, a propeller may act as a large disk of drag by pushing air against the forward motion of aircraft. As used in this disclosure a "forward momentum" is a quantity of motion of aircraft measured as a product of its mass and velocity. For example, and without limitation, aircraft may include a forward momentum of 100 kgm/s. As a further non-limiting example, aircraft may include a forward momentum of 8,000 kgm/s. In an embodiment, and without limitation, dissipating forward momentum by pushing air against a load device 116 may act as one or more braking mechanisms. As used in this disclosure a "braking mechanism" is a mechanical and/or electrical device that inhibits forward motion by producing energy opposite to forward momentum. As a non-limiting example, braking mechanism may include aircraft disc brakes, thrust reverses, air brakes, large drogue parachutes, and the like thereof. Braking mechanism may generate an aerodynamic drag to slow down the aircraft.

In another non-limiting embodiment, and still referring to FIG. 1, mitigation response 156 may include performing an emergency landing. An "emergency landing," as used in this disclosure, is an aircraft transitioning protocol for the purposes of making an impromptu and coordinated landing. For example and without limitation, computing device 104 may active and/or generate mitigation response 156 including a descent instruction set. A "descent instruction set," for the purpose of this disclosure, is a set of commands or instructions an aircraft is designed and configured to follow to land on a landing location. In a non-limiting embodiment, the descent instruction set may include commands for each load device of the electric aircraft. Mitigation response 156 may include a command to transition from a specific flight phase an electric aircraft is currently in. For instance and without limitation, the descent instruction set may be consistent with the descent instruction set in U.S. patent application Ser. No. 17/480,231, and entitled, "SYSTEMS AND METHODS FOR FIXED WING FLIGHT TO VERTICAL WING FLIGHT FOR LANDING FOR AN AIRCRAFT," which is incorporated by reference herein in its entirety.

With continued reference to FIG. 1, an inverter may control the power consumption of a load device. For example and without limitation, inverter_C 116 may be connected to load device 124. Sensor 120 of inverter_C 116 may identify a fault and activate mitigation response 156 for load device 124 via fault protection device 128. This may include isolating load device 124 and/or inverter 116. In another non-limiting embodiment, system 100 may include two inverters such as inverter_A 132 and inverter_B 140 connected to one load device such as load device 148. For example and without limitation, inverter_A 132 may experience a ground fault in which fault protection device 152 may isolate load device 148 from inverter_A 132 while inverter_B 140 may continue to regulate electrical output to load device 148. In another non-limiting example, both inverter_A 132 and inverter_B may work in tandem to control the power consumption of load device 148. For example and without limitation, sensor 136 and sensor 144 may measure environmental exposure data and/or any electrical data of load device 148. Sensor 136 may be triggered to measure and transmit data of load device 148 followed by sensor 140 via a physical CAN bus unit to computing device 104. For example and without limitation, sensor 144 may measure and transmit data 10 milliseconds after sensor 136. This is so, at least in part, for computing device 104 to detect any significant changes in parameters of load device 148. Changes in parameters may include a significant change in rate of voltage and/or current, level of moisture, chemicals, and/or dust, and the like thereof. Alternatively or additionally, these parameters may be compared to overvoltage threshold 160 for computing device 104 to determine whether a fault is present and/or activate mitigation response 156. Persons skilled in the art, upon reviewing the entirety of this disclosure, will be aware of the various embodiments and configurations of inverters and load devices for purposes as described herein.

Figure 2:
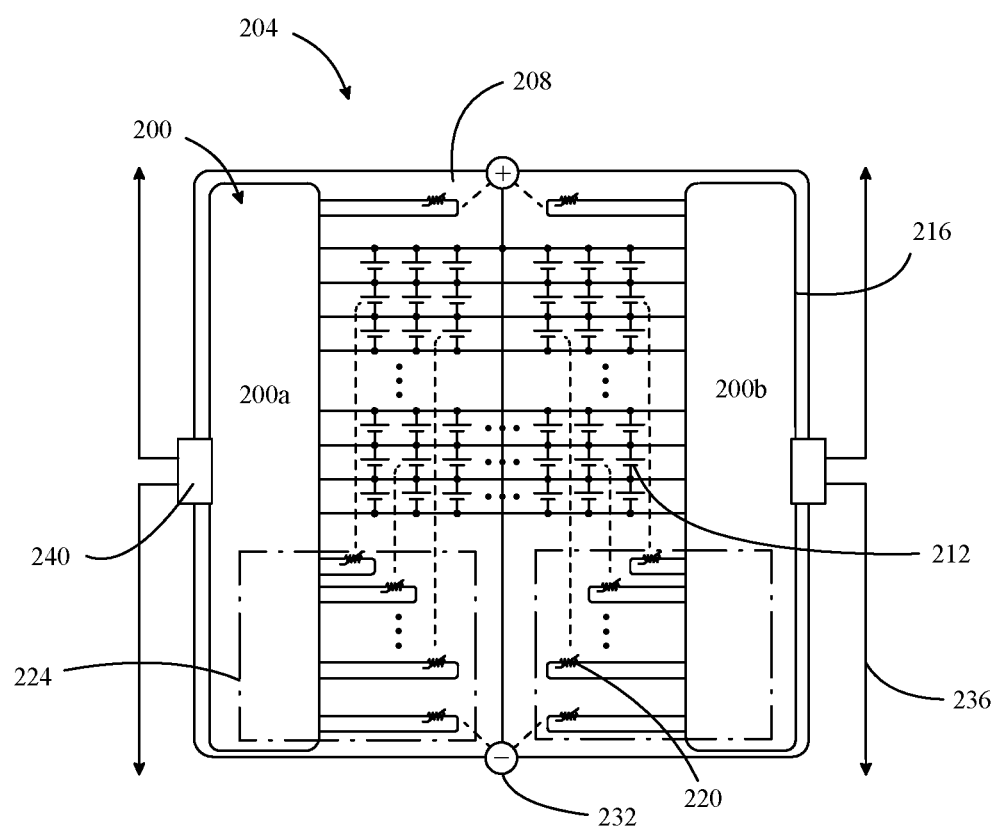
FIG. 2 is a block diagram of an exemplary embodiment of a module monitor unit in one or more aspect of the present disclosure.

Referring now to FIG. 2, an exemplary embodiment of a module monitor unit (MMU) 200 is presented in accordance with one or more embodiments of the present disclosure. In a non-limiting embodiment, energy storage element 108 may include a batter pack of a plurality of battery packs, wherein each battery pack includes a plurality of battery modules. Each battery module may include one or more MMU 200. In one or more embodiments, MMU 200 is configured to monitor an operating condition of a battery pack 204. For example, and without limitation, MMU 200 may monitor an operating condition of a battery module 208 and/or a battery cell 212 of battery pack 204. In a non-limiting embodiment, energy storage element 108 may include battery pack 204. In one or more embodiments, MMU 200 may be attached to battery module 208, as shown in FIG. 2. For example, and without limitation, MMU 200 may include a housing 216 that is attached to battery module 208, where circuitry of MMU 200 may be disposed at least partially therein, as discussed further in this disclosure. In other embodiments, MMU 200 may be remote to battery module 208. In one or more embodiments, housing 216 may include materials which possess characteristics suitable for thermal insulation, such as fiberglass, iron fibers, polystyrene foam, and thin plastic films, to name a few. Housing 216 may also include polyvinyl chloride (PVC), glass, asbestos, rigid laminate, varnish, resin, paper, Teflon, rubber, and mechanical lamina to physically isolate components of battery pack 204 from external components. In one or more embodiments, housing 216 may also include layers that separate individual components of MMU 200, which are discussed further below in this disclosure. As understood by one skilled in the art, housing 216 may be any shape or size suitable to attached to battery module 208 of battery pack 204.

Still referring to FIG. 2, in one or more embodiments, a plurality of MMUs 200 may be configured to monitor battery module 208 and/or battery cell 212. For instance, and without limitation, a first MMU 200a may be position at one end of battery module 208, and a second MMU 200b may be positioned at an opposing end of battery module 208. This arrangement may allow for redundancy in monitoring of battery cell 212. For example, and without limitation, if first MMU 200a fails, then second MMU 200b may continue to work properly and monitor the operating condition of each battery cell 212 of battery module 208. In one or more embodiments, MMU 200 may monitor the operating condition of a plurality of battery cells, as shown in FIG. 2. In one or more embodiments, MMU 200 is configured to detect a measurement parameter of battery module 208. For the purposes of this disclosure, a "measurement parameter" is detected electrical or physical input, characteristic, and/or phenomenon related to a state of battery pack 204. For example, and without limitation, a measurement parameter may be a temperature, a voltage, a current, a moisture level/humidity, a gas level, or the like, as discussed further in this disclosure. In one or more embodiments, MMU 200 is configured to perform load-sharing during the charging of battery pack 204. For instance, MMU 200 may regulate charge levels of battery cells 212. For example, charging of battery pack 204 may be shared throughout a plurality of battery cells 212 by directing energy through balance resistors and dissipating current through resistors as heat. For example, and without limitation, resistor may include a nonlinear resistor, such as a thermistor 220. In this manner, battery cells 212 may be charged evenly during recharging of battery pack 204 by, for example, a charging station or an electric grid. For example, and without limitation, battery cells with a lower amount of electrical energy will charge more than battery cells with a greater amount of energy.

With continued reference to FIG. 2, in one or more embodiments, MMU 200 is configured to monitor a temperature of battery module 208. For example, MMU 200 may include a sensor 224 configured to detect a temperature parameter of battery cell 212. For example, and without limitation, sensor 224 may include thermistor 220, which may be used to measure a temperature parameter of battery cell 212. As used in this disclosure, a thermistor includes a resistor having a resistance dependent on temperature. In one or more embodiments, sensor 224 may include circuitry configured to generate a measurement datum correlated to the detected measurement parameter, such as a temperature of battery cell 212 detected by thermistor 220. A thermistor may include metallic oxides, epoxy, glass, and the like. A thermistor may include a negative temperature coefficient (NTC) or a positive temperature coefficient (PTC). Thermistors may be beneficial do to being durable, compact, inexpensive, and relatively accurate. In one or more embodiments, a plurality of thermistors 220 may be used to provide redundant measuring of a state of battery cell 212, such as temperature. In other embodiments, MMU 200 may also include a resistance temperature detector (RTD), integrated circuit, thermocouple, thermometer, microbolometer, a thermopile infrared sensor, and/or other temperature and/or thermal sensors, as discussed further below in this disclosure. In one or more embodiments, thermistor 220 may detect a temperature of battery cell 212. Subsequently, MMU 200 may generate a sensor signal output containing information related to the detected temperature of battery cell 212. In one or more embodiments, sensor signal output may include measurement datum containing information representing a detected measurement parameter.

Still referring to FIG. 2, in one or more embodiments, sensor 224 may include a sensor suite 200 (shown in FIG. 2) or one or more individual sensors, which may include, but are not limited to, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, airspeed sensors, throttle position sensors, and the like. In a non-limiting embodiment, sensor 224 may be consistent with sensor 112. Sensor 224 may be a contact or a non-contact sensor. For example, and without limitation, sensor 224 may be connected to battery module 208 and/or battery cell 212. In other embodiments, sensor 224 may be remote to battery module and/or battery cell 212. Sensor 224 may be communicatively connected to controller 320 of PMU 312 (shown in FIG. 3) so that sensor 224 may transmit/receive signals to/from controller 320, respectively, as discussed below in this disclosure. Signals, such as signals of sensor 224 and controller 320, may include electrical, electromagnetic, visual, audio, radio waves, or another undisclosed signal type alone or in combination. In one or more embodiments, communicatively connecting is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit.

Figure 3:
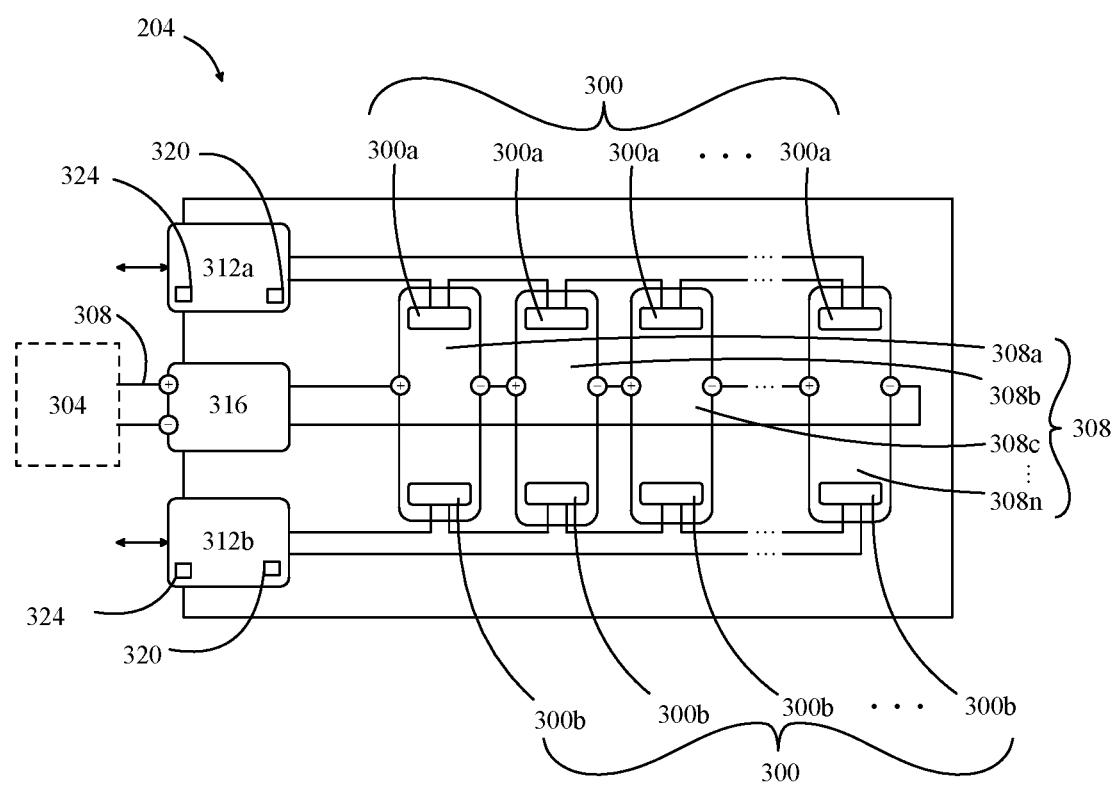
FIG. 3 is a block diagram of an exemplary embodiment of a battery pack in one or more aspects of the present disclosure.

In one or more embodiments, MMU 200 may include a control circuit that processes the received measurement datum from sensor 224, as shown in FIG. 3. In one or more embodiments, control circuit may be configured to perform and/or direct any actions performed by MMU 200 and/or any other component and/or element described in this disclosure. Control circuit may include any analog or digital control circuit, including without limitation a combinational and/or synchronous logic circuit, a processor, microprocessor, microcontroller, any combination thereof, or the like. In some embodiments, control circuit 228 may be integrated into MMU 200, as shown in FIG. 2. In other embodiments, control circuit 228 may be remote to MMU 200. In one or more nonlimiting exemplary embodiments, if measurement datum of a temperature of a battery module 208, such as at a terminal 232, is higher than a predetermined threshold, control circuit 228 may determine that the temperature of battery cell 212 indicates a critical event and thus is malfunctioning. For example, a high voltage (HV) electrical connection of battery module terminal 232 may be short circuiting. If control circuit 228 determines that a HV electrical connection is malfunctioning, control circuit 228 may terminate a physical and/or electrical communication of the HV electrical connection to prevent a dangerous or detrimental reaction, such as a short, that may result in an electrical shock, damage to battery pack 204, or even a fire. Thus, control circuit 228 may trip a circuit of battery pack 204 and terminate power flow through the faulty battery module 208 until the detected fault is corrected and/or the excessively high temperature is no longer detected. Temperature sensors, such as thermistor 220 may assist in the monitoring of a cell group's overall temperature, an individual battery cell's temperature, and/or battery module's temperature, as just described above.

In one or more embodiments, MMU 200 may not use software. For example, MMU 200 may not use software to improve reliability and durability of MMU 200. Rather, MMU 200 may be communicatively connected to a remote computing device, such as computing device 800 of FIG. 8. In one or more embodiments, MMU 200 may include one or more circuits and/or circuit elements, including without limitation a printed circuit board component, aligned with a first side of battery module 208 and the openings correlating to battery cells 212. In one or more embodiments, MMU 200 may be communicatively connected to a remote processing module, such as a controller. Controller may be configured to perform appropriate processing of detected temperature characteristics by sensor 224. In one or more embodiments, the controller may include an application-specific integrated circuit (ASIC), field-programmable gate array (FPGA), a central processing unit (CPU), readout integrated circuit (ROIC), or the like, and may be configured to perform characteristic processing to determine a temperature and/or critical event of battery module 208. In these and other embodiments, controller may operate in conjunction with other components, such as, a memory component, where a memory component includes a volatile memory and/or a non-volatile memory. In one or more embodiments, each MMU 200 may communicate with another MMU 200 and/or a controller via a communicative connection 236. Each MMU may use a wireless and/or wired connection to communicated with each other. For example, and without limitation, MMU 200a may communicate with an adjacent MMU 200a using an isoSPI connection 304 (shown in FIG. 3). As understood by one skilled in the art, and isoSPI connection may include a transformer to magnetically connect and electrically isolate a signal between communicating devices.

Now referring to FIG. 3, a battery pack with a battery management component 300 that utilizes MMU 200 for monitoring a status of battery pack is shown in accordance with one or more embodiments of the present disclosure. In one or more embodiments, the electric aircraft battery pack may be consistent with energy storage element 108. In another embodiment, the battery pack may include a battery module 208, wherein the battery module may also be energy storage element 108, which is configured to provide energy to an electric aircraft 304 via a power supply connection 308. For the purposes of this disclosure, a "power supply connection" is an electrical and/or physical communication between a battery module 208 and electric aircraft 304 that powers electric aircraft 304 and/or electric aircraft subsystems for operation. In one or more embodiments, the battery pack may include a plurality of battery modules, such as modules 208a-n. For example, and without limitation, the battery pack may include fourteen battery modules. In one or more embodiments, each battery module 208a-n may include a battery cell 212 (shown in FIG. 2).

Still referring to FIG. 3, the battery pack may include a battery management component 220 (also referred to herein as a "management component"). In one or more embodiments, battery management component 300 may be integrated into the battery pack in a portion of the battery pack or a subassembly thereof. In an exemplary embodiment, and without limitation, management component 300 may be disposed on a first end of the battery pack. One of ordinary skill in the art will appreciate that there are various areas in and on a battery pack and/or subassemblies thereof that may include battery management component 300. In one or more embodiments, battery management component 300 may be disposed directly over, adjacent to, facing, and/or near a battery module and specifically at least a portion of a battery cell. In one or more embodiments, battery management component 300 includes module monitor unit (MMU) 200, a pack monitoring unit (PMU) 312, and a high voltage disconnect 316. In one or more embodiments, battery management component 300 may also include a sensor 224. For example, and without limitation, battery management component 300 may include a sensor suite 200 having a plurality of sensors, as discussed further in this disclosure, as shown in FIG. 2.

In one or more embodiments, MMU 200 may be mechanically connected and communicatively connected to battery module 208. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. In one or more embodiments, MMU 200 is configured to detect a measurement characteristic of battery module 208 of the battery pack. For the purposes of this disclosure, a "measurement characteristic" is detected electrical or physical input and/or phenomenon related to a condition state of the battery pack. A condition state may include detectable information related to, for example, a temperature, a moisture level, a humidity, a voltage, a current, vent gas, vibrations, chemical content, or other measurable characteristics of the battery pack, battery module 208, and/or battery cell 212. For example, and without limitation, MMU 200 may detect and/or measure a measurement characteristic, such as a temperature, of battery module 208. In one or more embodiments, a condition state of the battery pack may include a condition state of a battery module 208 and/or battery cell 212. In one or more embodiments, MMU 200 may include a sensor, which may be configured to detect and/or measure measurement characteristic. In a non-limiting embodiment, the sensor may be a device that is configured to detect an input and/or a phenomenon and transmit information and/or datum related to the detection, as discussed further below in this disclosure. Output signal may include a sensor signal, which transmits information and/or datum related to the sensor detection. A sensor signal may include any signal form described in this disclosure, for example digital, analog, optical, electrical, fluidic, and the like. In some cases, a sensor, a circuit, and/or a controller may perform one or more signal processing steps on a signal. For instance, sensor, circuit, and/or controller may analyze, modify, and/or synthesize a signal in order to improve the signal, for instance by improving transmission, storage efficiency, or signal to noise ratio.

In one or more embodiments, MMU 200 is configured to transmit a measurement datum of battery module 208. MMU 200 may generate an output signal such as measurement datum that includes information regarding detected measurement characteristic. For the purposes of this disclosure, "measurement datum" is an electronic signal representing an information and/or a parameter of a detected electrical and/or physical characteristic and/or phenomenon correlated with a condition state of the battery pack. For example, measurement datum may include data of a measurement characteristic regarding a detected temperature of battery cell 212. In one or more embodiments, measurement datum may be transmitted by MMU 200 to PMU 312 so that PMU 312 may receive measurement datum, as discussed further in this disclosure. For example, MMU 200 may transmit measurement data to a controller 320 of PMU 312.

In one or more embodiments, MMU 200 may include a plurality of MMUs. For instance, and without limitation, each battery module 208a-n may include one or more MMUs 200. For example, and without limitation, each battery module 208a-n may include two MMUs 200a,b. MMUs 200a,b may be positioned on opposing sides of battery module 208. Battery module 208 may include a plurality of MMUs to create redundancy so that, if one MMU fails or malfunctions, another MMU may still operate properly. In one or more nonlimiting exemplary embodiments, MMU 200 may include mature technology so that there is a low risk. Furthermore, MMU 200 may not include software, for example, to avoid complications often associated with programming. MMU 200 is configured to monitor and balance all battery cell groups of the battery pack during charging of the battery pack. For instance, and without limitation, MMU 200 may monitor a temperature of battery module 208 and/or a battery cell of battery module 208. For example, and without limitation, MMU may monitor a battery cell group temperature. In another example, and without limitation, MMU 200 may monitor a terminal temperature to, for example, detect a poor HV electrical connection. In one or more embodiments, an MMU 200 may be indirectly connected to PMU 312. In other embodiments, MMU 200 may be directly connected to PMU 312. In one or more embodiments, MMU 200 may be communicatively connected to an adjacent MMU 200.

Still referring to FIG. 3, battery management component 300 includes a pack monitoring unit (PMU) 228 may be connected to MMU 200. In one or more embodiments, PMU 312 includes a controller 320, which is configured to receive measurement datum from MMU 200, as previously discussed in this disclosure. For example, PMU 312a may receive a plurality of measurement data from MMU 200a. Similarly, PMU 312b may receive a plurality of measurement data from MMU 200b. In one or more embodiments, PMU 312 may receive measurement datum from MMU 200 via communicative connections. For example, PMU 312 may receive measurement datum from MMU 200 via an isoSPI communications interface. In one or more embodiments, controller 320 of PMU 312 is configured to identify an operating of battery module 208 as a function of measurement datum. For the purposes of this disclosure, an "operating condition" is a state and/or working order of the battery pack and/or any components thereof. For example, and without limitation, an operating condition may include a state of charge (SoC), a depth of discharge (DoD), a temperature reading, a moisture level or humidity, a gas level, a chemical level, or the like. In one or more embodiments, controller 320 of PMU 312 is configured to determine a critical event element if operating condition is outside of a predetermined threshold (also referred to herein as a "predetermined threshold"). For the purposes of this disclosure, a "critical event element" is a failure and/or critical operating condition of a battery pack, battery cell, and/or battery module that may be harmful to the battery pack and/or electric aircraft 304. For instance, and without limitation, if an identified operating condition, such as a temperature of a battery cell 212 of the battery pack, does not fall within a predetermined threshold, such as a range of acceptable, operational temperatures of the battery cell, then a critical event element is determined by controller 320 of PMU 312. For example, and without limitation, PMU may be used measurement datum from MMU to identify a temperature of 95 degrees Fahrenheit for a battery cell. If the predetermined threshold is, for example, 75 to 90 degrees Fahrenheit, then the determined operating condition is outside of the predetermined threshold, such as exceeding the upper limit of 90 degrees Fahrenheit, and a critical event element is determined by controller 320. As used in this disclosure, a "predetermined threshold" is a limit and/or range of an acceptable quantitative value and/or representation related to a normal operating condition of a battery pack and/or components thereof. In one or more embodiments, an operating condition outside of the threshold is a critical operating condition, which triggers a critical event element, and an operating condition within the threshold is a normal operating condition that indicates that the battery pack is working properly. For example, and without limitation, if an operating condition of temperature exceeds a predetermined threshold, then battery pack is considered to be operating at a critical operating condition and may be at risk of overheating and experiencing a catastrophic failure.

In one or more embodiments, controller 320 of PMU 312 is configured to generate an action command if critical event element is determined by controller 320. Continuing the previously described example above, if an identified operating condition includes a temperature of 95 degrees Fahrenheit, which exceeds a predetermined threshold, then controller 320 may determine a critical event element indicating that the battery pack is working at a critical temperature level and at risk of catastrophic failure. In one or more embodiments, critical event elements may include high shock/drop, overtemperature, undervoltage, high moisture, contactor welding, and the like.

In one or more embodiments, controller 320 may include a computing device (as discussed in FIG. 8), a central processing unit (CPU), a microprocessor, a digital signal processor (DSP), an application specific integrated circuit (ASIC), a control circuit, a combination thereof, or the like. In one or more embodiments, output signals from various components of the battery pack may be analog or digital. Controller 320 may convert output signals from MMU 200 and/or sensor 224 to a usable form by the destination of those signals. The usable form of output signals from MMUs and/or sensors, through processor may be either digital, analog, a combination thereof, or an otherwise unstated form. Processing may be configured to trim, offset, or otherwise compensate the outputs of sensor. Based on MMU and/or sensor output, controller can determine the output to send to a downstream component. Processor can include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components. In one or more embodiments, PMU 312 may run state estimation algorithms.

Still referring to FIG. 3, in one or more embodiments, MMU 200 may be implemented in battery management system 300 of the battery pack. MMU 200 may include sensor 224, as previously mentioned above in this disclosure. For instance, and without limitation, MMU 200 may include a plurality of sensors. For example, MMU 200 may include thermistors 220 to detect a temperature of a corresponding battery module 208 and/or battery cell 212. MMU 200 may include sensor 220 or a sensor suite that is configured to measure physical and/or electrical parameters of the battery pack of power source 116, such as without limitation temperature, voltage, current, orientation, or the like, of one or more battery modules and/or battery cells 212. MMU 200 may configured to generate a measurement datum of each battery cell 212, which a control circuit may ultimately use to determine a failure within battery module 208 and/or battery cell 212, such as a critical event element. Cell failure may be characterized by a spike in temperature and MMU 200 may be configured to detect that increase, which in turn, PMU 312 uses to determine a critical event element and generate signals, to disconnect a power supply connection between electric aircraft* and battery cell 212 and to notify users, support personnel, safety personnel, maintainers, operators, emergency personnel, aircraft computers, or a combination thereof. In one or more embodiments, measurement data of MMU may be stored in memory component 324.

Still referring to FIG. 3, battery management component 300 may include high voltage disconnect 232, which is communicatively connected to battery module 208, wherein high voltage disconnect 232 is configured to terminate power supply connection 212 between battery module 208 and electric aircraft 304 in response to receiving action command from PMU 312. PMU 312 may be configured to determine a critical event element, such as high shock/drop, overtemperature, undervoltage, contactor welding, and the like. High voltage disconnect 232 is configured to receive action command generated by PMU 312 and lock out the battery pack of power source 116 for maintenance in response to received action command. In one or more embodiments, PMU 312 may create a lockout flag, which may be saved across reboots. A lockout flag may include an indicator alerting a user of termination of power supply connection 212 by high voltage disconnect 232. For instance, and without limitation, a lockout flag may be saved in a database od PMU 312 so that, despite rebooting the battery pack of power source 116 or complete loss of power of the battery pack, power supply connection remains terminated and an alert regarding the termination remains. In one or more embodiments, lockout flag cannot be removed until a critical event element is no longer determined by controller 320. For, example, PMU 312 may be continuously updating an operating condition and determining if operating condition is outside of a predetermined threshold. In one or more embodiments, lockout flag may include an alert on a graphic user interface of, for example, a remote computing device, such as a mobile device, tablet, laptop, desktop and the like. In other embodiments, lockout flag may be indicated to a user via an illuminated LED that is remote or locally located on the battery pack. In one or more embodiments, PMU 312 may include control of cell group balancing via MMUs, control of contactors (high voltage connections, etc.) control of welding detection, control of pyro fuses, and the like.

In one or more embodiments, battery management component 300 may include a plurality of PMUs 312. For instance, and without limitation, battery management component 300 may include a pair of PMUs. For example, and without limitation, battery management component 300 may include a first PMU 312a and a second PMU 312b, which are each disposed in or on the battery pack of power source 116 and may be physically isolated from each other. "Physical isolation", for the purposes of this disclosure, refer to a first system's components, communicative connection, and any other constituent parts, whether software or hardware, are separated from a second system's components, communicative coupling, and any other constituent parts, whether software or hardware, respectively. Continuing in reference to the nonlimiting exemplary embodiment, first PMU 312a and second PMU 312b may perform the same or different functions. For example, and without limitation, the first and second PMUs 312a,b may perform the same, and therefore, redundant functions. Thus, if one PMU 312a/b fails or malfunctions, in whole or in part, the other PMU 312b/a may still be operating properly and therefore battery management component 300 may still operate and function properly for the battery pack. One of ordinary skill in the art would understand that the terms "first" and "second" do not refer to either PMU as primary or secondary. In non-limiting embodiments, the first and second PMUs 312a,b, due to their physical isolation, may be configured to withstand malfunctions or failures in the other system and survive and operate. Provisions may be made to shield first PMU 312a from PMU 312b other than physical location, such as structures and circuit fuses. In non-limiting embodiments, first PMU 312a, second PMU 312b, or subcomponents thereof may be disposed on an internal component or set of components within the battery pack, such as on battery module sense board, as discussed further below in this disclosure.

Still referring to FIG. 3, first PMU 312a may be electrically isolated from second PMU 312b. "Electrical isolation", for the purposes of this disclosure, refer to a first system's separation of components carrying electrical signals or electrical energy from a second system's components. First PMU 312a may suffer an electrical catastrophe, rendering it inoperable, and due to electrical isolation, second PMU 312b may still continue to operate and function normally, allowing for continued management of the battery pack of electric aircraft 204. Shielding such as structural components, material selection, a combination thereof, or another undisclosed method of electrical isolation and insulation may be used, in nonlimiting embodiments. For example, and without limitation, a rubber or other electrically insulating material component may be disposed between electrical components of first and second PMUs 312a,b, preventing electrical energy to be conducted through it, isolating the first and second PMUs 312a,b form each other.

With continued reference to FIG. 3, battery management component 300 may include memory component 324, as previously mentioned above in this disclosure. In one or more embodiments, memory component 324 may be configured to store datum related to the battery pack, such as data related to battery modules 208a-n and/or battery cells 212. For example, and without limitation, memory component 324 may store sensor datum, measurement datum, operation condition, critical event element, lockout flag, and the like. Memory component 324 may include a database. Memory component 324 may include a solid-state memory or tape hard drive. Memory component 324 may be communicatively connected to PMU 312 and may be configured to receive electrical signals related to physical or electrical phenomenon measured and store those electrical signals as battery module data. Alternatively, memory component 324 may be a plurality of discrete memory components that are physically and electrically isolated from each other. One of ordinary skill in the art would understand the virtually limitless arrangements of data stores with which battery pack of power source 116 could employ to store battery pack data.

Figure 4:
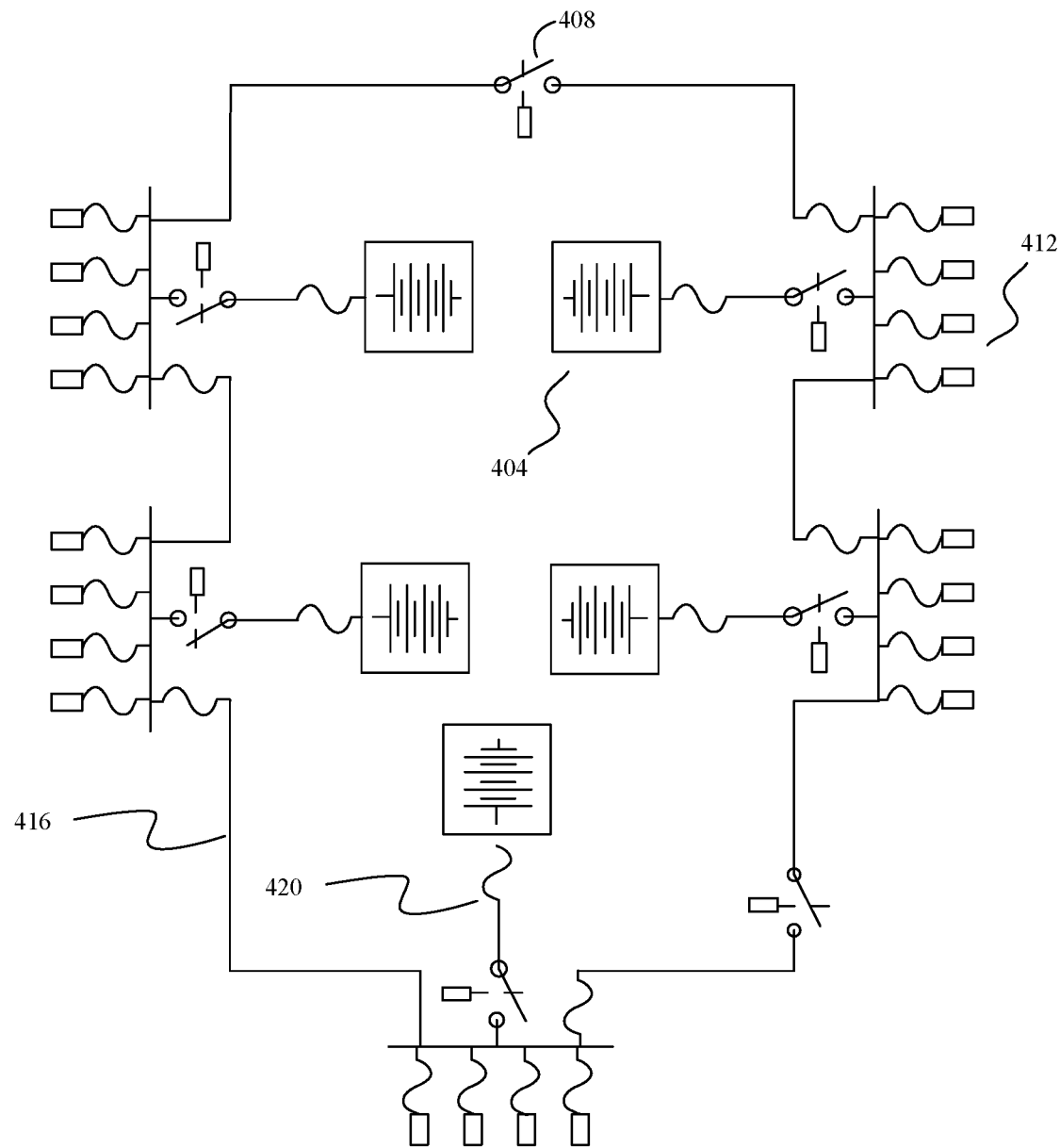
FIG. 4 is a schematic diagram an exemplary embodiment of a system for a bus element connected with an energy storage element.

Referring now to FIG. 4, an exemplary embodiment of system 400 for a bus element connected with an energy storage element is represented. System 400 may include a first energy storage element 404. An energy storage element may be consistent with any energy storage element as described above. First energy storage element 404 may be consistent with any energy storage element as described in this disclosure. For example, and without limitation, first energy storage element 404 may include a plurality of battery packs, battery modules, battery cells, or other types of energy storage elements electrically connected together in series and/or parallel. One of ordinary skill in the art would appreciate that there are five energy storage elements illustrated in FIG. 4, however, any number of energy storage elements may be included in system and operate according to the herein described methodology. For example, and without limitation, first energy storage element 404 and any of the plurality of energy storage elements illustrated or described may include portions of larger energy storage elements such as five battery modules housed within one battery pack. For example, and without limitation, first energy storage element 404 may include more than one battery modules housed within one battery pack, a second energy storage element may include a single battery module housed within the same battery pack, and a third energy storage element may include an entire battery pack. One of ordinary skill in the art will appreciate the vast arrangements of energy storage elements and the respective capacities thereof.

With continued reference to FIG. 4, exemplary embodiment of system 400 may include a bus element 408. Bus element 408 may be consistent with any bus element as described in this disclosure. In a non-limiting embodiment, bus element 408 may be consistent with the laminated bus of electrical bridging device 104. Alternatively or additionally, electrical bridging device 104 may include bus element 408. Bus element 408 may be any manner of conductive material configured to convey electrical energy in any form as described in this disclosure between components. For example, and without limitation, bus element 408 may include any number of components electrically connected thereto, including circuit elements, energy storage elements, propulsors, flight control components, one or more computing devices, sensors, or combination thereof, among others. Bus element 408 may include a plurality of wires or conductive strips, bars, structures, or a combination thereof. Bus element 408 may be configured to convey electrical energy configured to power one or more other components electrically connected thereto and/or be configured to convey electrical energy configured to transmit signals between one or more components.

With continued reference to FIG. 4, exemplary embodiment of system 400 include a cross tie element 412. Cross tie element 412 may include any electrical switches, relays, components, or combinations thereof. Cross tie element 412 may be electrically connected to bus element 408 and through said bus element 408 may be electrically and communicatively connected to any one or more components as described in this disclosure, namely any of the plurality of energy storage elements such as first energy storage element 404. Cross tie element 412 may be configured to receive one or more electrical signals configured to open or close cross tie element 412. Cross tie element 412, through said opening and closing may electrically disconnect or connect, respectively, first energy storage element from second energy storage element or plurality of energy storage elements as described in this disclosure.

With continued reference to FIG. 4, exemplary embodiment of system 400 may include a load device 416. Load device 416 may be consistent with any load device as described above. Load device 416 may be electrically and communicatively connected to any of the plurality of other components as described in this disclosure through bus element 408. Load device 416 may be one of a plurality of propulsors as described in this disclosure. For example, and without limitation, load device 416 may include an electric motor, an actuator consistent with any actuator as described in this disclosure, one or more computing devices, or any other propulsor configured to manipulate a fluid medium.

With continued reference to FIG. 4, exemplary embodiment of system 400 may include a fuse 420. Fuse 420 may be consistent with any fuse as described in this disclosure. In general, and for the purposes of this disclosure, a fuse is an electrical safety device that operate to provide overcurrent protection of an electrical circuit. As a sacrificial device, its essential component may be metal wire or strip that melts when too much current flows through it, thereby interrupting energy flow. Fuse 420 may include a thermal fuse, mechanical fuse, blade fuse, expulsion fuse, spark gap surge arrestor, varistor, or a combination thereof. Fuse 420 may be implemented in any number of arrangements and at any point or points within exemplary embodiment of system 400. Fuse 420 may be included between plurality of energy storage elements, propulsors, cross tie elements, or any other component electrically connected to bus element 408. Fuse 420 may be implemented between any other electrical components connected anywhere or in any system comprised by the herein disclosed embodiments.

Figure 5:
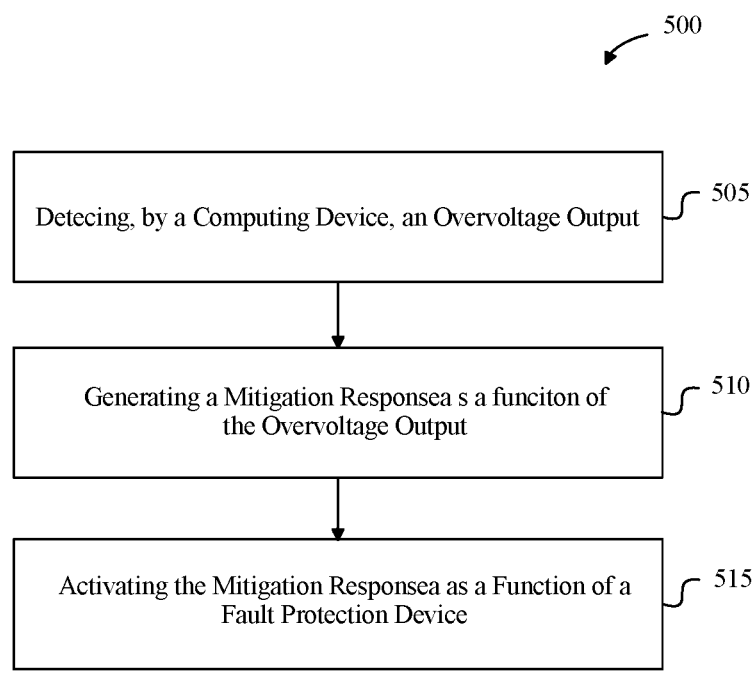
FIG. 5 is a flow diagram of an exemplary embodiment of a method for overvoltage protection on loads for use in an electric aircraft.

Now referring to FIG. 5, a flow diagram of an exemplary embodiment of a method 500 for overvoltage protection on loads for use in an electric aircraft is provided. Method 500, at step 505, may include detecting, by a computing device, an overvoltage output. The computing device may include any computing device as described herein. The overvoltage output may include any overvoltage output as described herein. In a non-limiting embodiment, method 500 may include measuring, by a sensor, a measured exposure data. The sensor may include any sensor as described herein. The measured storage data may include any measured exposure data as described herein. The energy storage element may be consistent with any energy storage element as described herein. The electrical output may be consistent with any electrical output as described herein. Method 500 may also include identifying a ground fault. The ground fault may include any ground fault as described herein.

In a non-limiting embodiment, and still referring to FIG. 5, method 500, may include transferring, by a bus element, the electrical output from the energy storage element. The bus element may be consistent with any bus element as described herein. In a non-limiting embodiment, method 500 may include transferring signals of computing device 104 as a function of a physical CAN bus unit. The physical CAN bus unit may include any physical CAN bus unit as described herein. In a non-limiting embodiment, method 500, may include generating, by an inverter of a plurality of inverters, a regulated output as a function of the electrical output. The inverter may include any inverter as described herein. The regulated output may include any regulated output as described herein.

Still referring to FIG. 5, method 500, at step 515, may include activating a mitigation response as a function of a fault protection device. In a non-limiting embodiment, the mitigation response may be activated on a load device of a plurality of load devices, wherein each load device is connected to at least an inverter. The at least an inverter may include any inverter as described herein. The load device may include any load device as described herein. The mitigation response may include any mitigation response as described herein. In some embodiments, the fault protection device further may include a ground fault protection relay. The ground fault protection relay may include any ground fault protection relay as described herein. In a non-limiting embodiment, the mitigation response is activated based on an overvoltage threshold. The overvoltage threshold may include any overvoltage threshold as described herein. In some embodiments, method 500 may include tripping a fuse of the fault protection device. In another embodiment, method 500 may include terminating a transmission of regulated output through the plurality of inverters.

Figure 6:
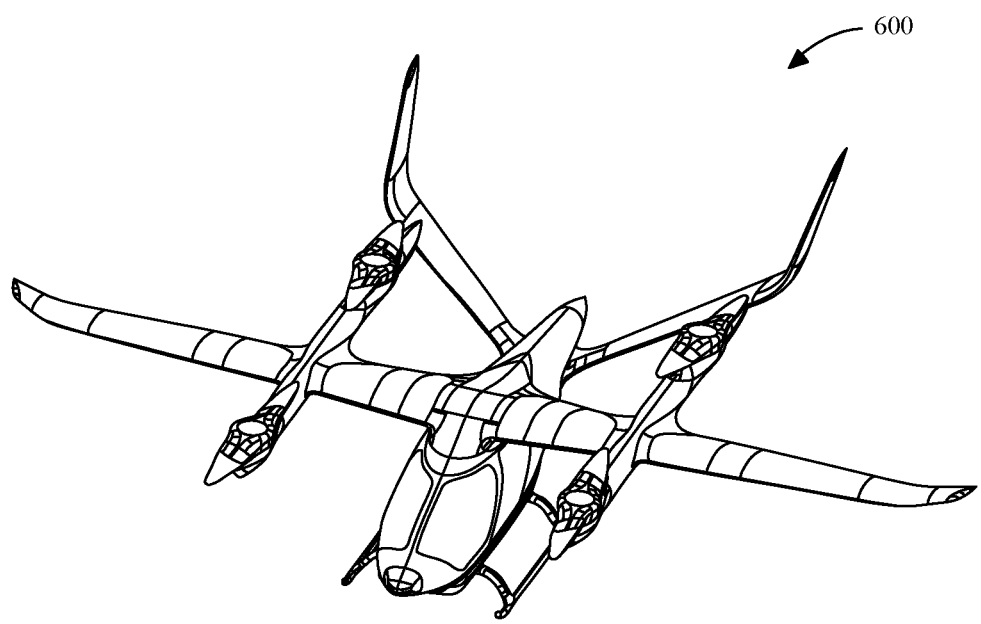
FIG. 6 is a schematic diagram of an exemplary embodiment of an electric aircraft.

Now referring to FIG. 6, a schematic diagram of an exemplary embodiment of an electric aircraft 600 is illustrated in accordance with one or more embodiments of the present disclosure. An "aircraft", as described herein, is a vehicle that travels through the air. As a non-limiting example, aircraft may include airplanes, helicopters, airships, blimps, gliders, paramotors, drones, and the like. Additionally or alternatively, an aircraft may include one or more electric aircrafts and/or hybrid electric aircrafts. For example, and without limitation, electric aircraft 600 may include an electric vertical takeoff and landing (eVTOL) aircraft, as shown in FIG. 6. As used herein, a vertical takeoff and landing (eVTOL) aircraft is an electrically powered aircraft that can take off and land vertically. An eVTOL aircraft may be capable of hovering. In order, without limitation, to optimize power and energy necessary to propel an eVTOL or to increase maneuverability, the eVTOL may be capable of rotor-based cruising flight, rotor-based takeoff, rotor-based landing, fixed-wing cruising flight, airplane-style takeoff, airplane-style landing, and/or any combination thereof. Rotor-based flight is where the aircraft generates lift and propulsion by way of one or more powered rotors coupled with an engine, such as a "quad copter," helicopter, or other vehicle that maintains its lift primarily using downward thrusting propulsors. Fixed-wing flight, as described herein, flight using wings and/or foils that generate life caused by an aircraft's forward airspeed and the shape of the wings and/or foils, such as in airplane-style flight.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
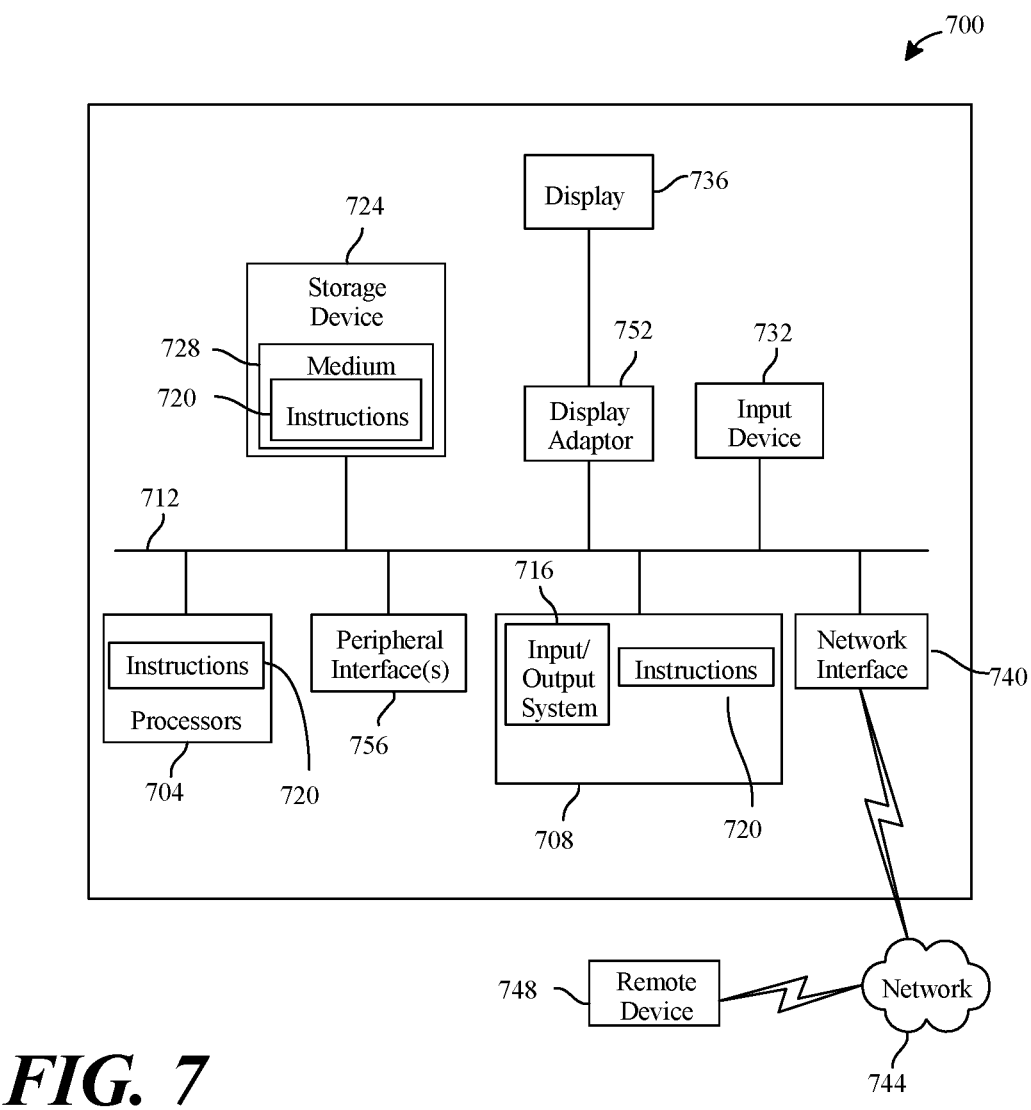
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for overvoltage protection on loads for use in an electric aircraft, the system comprising:
   an energy storage element configured to produce an electrical output;
   a bus element comprising a laminated busbar, wherein the bus element is configured to transfer the electrical output from the energy storage element;
   a plurality of inverters, wherein each inverter is configured to:
     generate a regulated output as a function of the electrical output; and
     detect an overvoltage output as a function of the regulated output;
   a plurality of load devices connected to the plurality of inverters, wherein each load device includes a fault protection device, and the bus element is further configured to connect the plurality of load devices to a computing device utilizing a physical CAN bus unit; and
   a computing device communicatively connected to the bus element and configured to activate a mitigation response as a function of an identification of the overvoltage output, wherein the mitigation response comprises the plurality of inverters working in tandem to mitigate damage.

2. The system of claim 1, wherein the plurality of load devices further comprises an electric motor.

3. The system of claim 1, wherein the plurality of load devices further comprises a pusher.

4. The system of claim 1, wherein each inverter comprises a sensor configured to measure an environmental exposure data.

5. The system of claim 1, wherein the bus element comprises a ring bus.

6. The system of claim 1, wherein the fault protection device further comprises a ground fault protection device.

7. The system of claim 6, wherein the fault protection device further comprises a ground fault protection relay.

8. The system of claim 1, wherein the fault protection device is activated based on an overvoltage threshold.

9. The system of claim 1, wherein the fault protection device further comprises a fuse.

10. The system of claim 1, wherein the fault protection circuit is further configured to terminate a transmission of regulated output through the plurality of inverters.

11. The system of claim 1, wherein the mitigation response further comprises activating the fault protection device.

12. The system of claim 10, wherein the mitigation response comprises a response by the computing device to restart at least an inverter of the plurality of inverters experiencing a fault.

13. The system of claim 10, wherein the mitigation response further comprises an emergency landing response.

14. A method for overvoltage protection on loads within an electric aircraft, the system comprising:
   generating, using an energy storage element, an electrical output;
   transferring, using a bus element comprising a laminated busbar, the electrical output from the energy storage element;
   generating, using a plurality of inverters, a regulated output as a function of the electrical output; and
   detecting, using the plurality of inverters, a overvoltage output as a function of the regulated output;

connecting a plurality of load devices to the plurality of inverters, wherein each load device includes a fault protection device;

connecting, by the bus element, the plurality of load devices to a computing device utilizing a physical CAN bus unit; and activating, by a computing device communicatively connected to the bus element, a mitigation response as a function of an identification of the overvoltage output, wherein the mitigation response comprises the plurality of inverters working in tandem to mitigate damage.

15. The method of claim 14, wherein the method further comprise measuring, by a sensor, an environmental exposure data.

16. The method of claim 15, wherein detecting the overvoltage output further comprises identifying, by the sensor, a ground fault.

17. The method of claim 14, wherein the fault protection device further comprises a ground fault protection relay.

18. The method of claim 14, wherein the method further comprises generating a mitigation response as a function of the overvoltage output.

19. The method of claim 18, wherein activating the mitigation response comprises tripping a fuse of the fault protection device.

20. The method of claim 19, wherein activating the mitigation response further comprises terminating a transmission of regulated output through the plurality of inverters.

* * * * *